(12) United States Patent
De Maré et al.

(10) Patent No.: US 11,365,715 B2
(45) Date of Patent: Jun. 21, 2022

(54) ESTIMATION OF YAW MISALIGNMENT FOR A WIND TURBINE

(71) Applicant: Ørsted Wind Power A/S, Fredericia (DK)

(72) Inventors: Martin De Maré, Lund (SE); Lars Henrik Hansen, Roskilde (DK); Sidse Damgaard Hansen, Skanderborg (DK); Frederik Ettrup Brink, Humlebæk (DK); Arne Hedevang, Fredericia (DK); Anders Nordberg Lauritsen, Odense S (DK)

(73) Assignee: ØRSTED WIND POWER A/S

( * ) Notice: Subject to any disclaimer, the term of this patent is extended or adjusted under 35 U.S.C. 154(b) by 593 days.

(21) Appl. No.: 16/300,968

(22) PCT Filed: May 11, 2017

(86) PCT No.: PCT/DK2017/050150
§ 371 (c)(1),
(2) Date: Nov. 13, 2018

(87) PCT Pub. No.: WO2017/194067
PCT Pub. Date: Nov. 16, 2017

(65) Prior Publication Data
US 2020/0318609 A1   Oct. 8, 2020

(30) Foreign Application Priority Data

May 12, 2016 (EP) ..................... 16169367

(51) Int. Cl.
*F03D 7/02* (2006.01)
*F03D 17/00* (2016.01)

(52) U.S. Cl.
CPC .......... *F03D 7/0204* (2013.01); *F03D 17/00* (2016.05); *F05B 2260/80* (2013.01);
(Continued)

(58) Field of Classification Search
CPC ........ F03D 7/0204; F03D 17/00; F03D 80/50; F05B 2260/80; F05B 2270/20;
(Continued)

(56) References Cited

U.S. PATENT DOCUMENTS

| 8,476,780 B2 | 7/2013 | Hashimoto et al. |
| 2007/0183885 A1 | 8/2007 | Ormel et al. |

(Continued)

FOREIGN PATENT DOCUMENTS

| DE | 102009015167 | 9/2010 |

OTHER PUBLICATIONS

Farrett Felix A, et al; "Sensorless active yaw control for wind turbines", New York, NY. IEEE, vol. 2, Nov. 29, 2001 (Nov. 29, 2001), pp. 1370-1375.

*Primary Examiner* — Joseph Ortega
(74) *Attorney, Agent, or Firm* — Condo Roccia Koptiw LLP

(57) ABSTRACT

Disclosed is a method for estimating systematic yaw misalignment of a wind turbine. The method comprising the steps of: receiving yaw data from the wind turbine indicative of the degrees of rotation of the nacelle for a plurality of yaw operations; receiving performance data from the wind turbine indicative of the alignment of the nacelle of the wind turbine with the wind direction before and after each of the plurality of yaw operations. The yaw data and the performance data being recorded during normal operation of the wind turbine, and the yaw data and the performance data is processed together to estimate the systemic yaw misalignment of the wind turbine.

18 Claims, 6 Drawing Sheets

(52) U.S. Cl.
CPC ..... *F05B 2270/20* (2013.01); *F05B 2270/321* (2013.01); *F05B 2270/327* (2013.01); *F05B 2270/328* (2013.01); *F05B 2270/329* (2013.01); *F05B 2270/335* (2013.01); *F05B 2270/802* (2013.01)

(58) Field of Classification Search
CPC .......... F05B 2270/321; F05B 2270/327; F05B 2270/328; F05B 2270/329; F05B 2270/335; F05B 2270/802; Y02E 10/72
See application file for complete search history.

(56) References Cited

U.S. PATENT DOCUMENTS

| | | |
|---|---|---|
| 2010/0066087 A1 | 3/2010 | Hayashi et al. |
| 2010/0332272 A1* | 12/2010 | Ong .................. F03D 17/00 705/7.36 |
| 2011/0101691 A1* | 5/2011 | Hashimoto ............ F03D 7/042 290/44 |
| 2011/0210549 A1 | 9/2011 | Haag et al. |
| 2014/0167415 A1 | 6/2014 | Mykhaylyshyn |
| 2015/0086357 A1 | 3/2015 | Gregg |
| 2017/0285066 A1 | 10/2017 | Esbensen |

* cited by examiner

ESTIMATION OF YAW MISALIGNMENT FOR A WIND TURBINE

CROSS REFERENCE TO RELATED APPLICATIONS

This application is the National Stage Entry under 35 U.S.C. § 371 of Patent Cooperation Treaty Application No. PCT/DK2017/050150, filed 11 May 2017, which claims priority from European Application No. 16169367.6, filed 12 May 2016, the contents of which are hereby incorporated by reference herein.

FIELD

The present invention relates to a method for estimating systematic yaw misalignment of a wind turbine, a method for installing a wind turbine, a method of calibrating a yaw control system of a wind turbine, and a method of identifying a faulty yaw control system of a wind turbine and correcting the faulty yaw control system.

BACKGROUND

Wind turbines are most efficient when they directly face the wind direction. Most modern wind turbines use a yaw control system to align the wind turbine with the wind direction. The yaw control system typically comprises one or more wind direction sensors that are configured to measure/estimate the relative wind direction defined as the difference between the facing of the nacelle of the wind turbine and the wind direction. Once the relative wind direction is above/below a predetermined threshold, the yaw control system yaws the nacelle of the wind turbine so that the nacelle faces the measured/estimated wind direction.

Measuring/estimating the relative wind direction precisely is however a difficult task. The task is furthermore not made easier since the one or more wind direction sensors typically are arranged behind rotor blades that may distort the measurements.

US2007183885A discloses a method for optimizing the operation of a wind turbine. The method comprises the steps of: (a) adjusting at least one control parameter of said wind turbine to a predetermined starting value; (b) measuring at least one response variable of said wind turbine and at least one further variable indicative of an ambient condition of the wind turbine; (c) repeating step (b) N times, wherein N is a predetermined integer, wherein said at least one control parameter is varied at each repetition; (d) determining a measured relation between the at least one control parameter with respect to the at least one response variable and the at least one further variable indicative of an ambient condition; (e) determining an optimized value of said at least one control parameter with respect to said response variable from said measured relation; (f) adjusting a set point of said at least one control parameter to said optimized value.

It is however a problem with the above mentioned method that the wind turbine must be set into a special calibration mode where its productivity is lowered. Furthermore, since only a limited amount of data is available the precision of the method is limited.

Thus it remains a problem to provide a simple and more precise method for estimating systematic yaw misalignment.

SUMMARY

According to a first aspect, the invention relates to a method for estimating systematic yaw misalignment of a wind turbine having a nacelle and a yaw control system, comprising the steps of:

receiving yaw data from the wind turbine indicative of the degrees of rotation of the nacelle for a plurality of yaw operations;

receiving performance data from the wind turbine indicative of the alignment of the nacelle of the wind turbine with the wind direction before and after each of the plurality of yaw operations;

wherein the yaw data and the performance data is recorded during normal operation of the wind turbine and wherein the yaw data and the performance data is processed together to estimate the systemic yaw misalignment of the wind turbine.

Consequently, by estimating the systematic yaw misalignment of the wind turbine using data recorded during normal operation of the wind turbine, large amount of data is available thereby improving the precision of the method. This furthermore enables the method to take account of effects that only occurs in special situation such as under specific weather conditions. The use of data recorded during normal operation furthermore enables detection of yaw misalignment without the use of complicated calibration procedures that reduces the performance of the wind turbine while it operates.

The yaw data may specify the degrees of rotation of the nacelle for the plurality of yaw operations. The yaw data may preferably specify the degrees of rotation for all yaw operations within a particular time period. The yaw data may preferably furthermore specify the direction of rotation for the plurality of yaw operations. The yaw data may furthermore specify the time for each yaw operation e.g. date, hour, minute, second for each of the plurality of yaw operations. The yaw data may be generated by the yaw control system of the wind turbine. The yaw control system may save the yaw data in a memory unit. The wind turbine may be a horizontal-axis wind turbine. The wind turbine may comprise a primary wind direction sensor and a backup wind direction sensor, wherein the yaw data further specifies which senor that was used for the particular yaw operation. The performance data may be indicative of the potential ability of the wind turbine to transfer kinetic energy from the wind into electrical power. The performance data may specify values of a parameter indicative of the alignment of the nacelle with the wind direction, wherein the value of the parameter is periodically sampled. The performance data may furthermore specify directly or indirectly the time when each value is sampled e.g. date, hour, minute, second etc. for each value.

The yaw data and the performance data may be received in a processing unit, wherein the processing unit process the yaw data and the performance data together to estimate the systematic yaw misalignment. The processing unit may be arranged in the wind turbine or remote from the wind turbine.

In some embodiments, the performance data comprises data indicative of one or more of the following:

generator output power;

rotational speed of the blades of the wind turbine; and/or pitch angle of the blades of the wind turbine.

Consequently, by using standard data the method may be used for both existing and future wind turbines.

The generator output power is an effective measure of the alignment of the nacelle of the wind turbine with the wind direction i.e. the generator output power is lower when the nacelle is unaligned with the wind direction than when the nacelle is aligned with the wind direction. The generator output power may be periodically sampled with a fixed sample frequency. The reciprocal of the fixed sample frequency (the sampling period) may preferably be substantially lower than the average time between two yaw operations whereby one or more samples may be used to determine the generator output power before a yaw operation and one or more samples may used to determine the generator output power after the yaw operation. As an alternative to using the generator output power the rotational speed of the blades of the wind turbine may be used as the two typically are closely correlated.

Using the generator output power or the rotational speed of the rotor blades will however only work when the wind turbine is operating below its rated power. Once the rated power is reached wind turbines typically uses a pitch control system to change the pitch of the wind turbine blades to reduce the load on the wind turbine blades. This however enables the pitch angle to be used as a measure of the alignment of the nacelle with the wind direction under high wind speed conditions, i.e. when the nacelle is unaligned with the wind direction the pitch angle is closer to highest power point than when the nacelle is aligned with the wind direction.

In some embodiments, the yaw data and the performance data is recorded for a measurement period of at least 24 hours, 48 hours, 1 week, 2 weeks, 1 month, 3 months, 6 months, or 12 months.

Consequently, a more precise estimate of the systematic yaw misalignment may be obtained. The long measurement period will allow data to be used having a poor signal to noise ratio (SNR) and enable an estimate to be made that is at least fairly independent of external factors that may influence the performance of the yaw control system such as special weather conditions.

The yaw control system of the wind turbine may be configured to optimally align the nacelle of the wind turbine with the detected wind direction for the measurement period, i.e. for each yaw operation the yaw control system may be configured to firstly estimate the wind direction and secondly rotate the nacelle of the wind turbine so that the nacelle faces the estimated wind direction.

In some embodiments, for each yaw operation of the plurality of yaw operations, the yaw control system is configured to firstly estimate the absolute or relative wind direction and secondly rotate the nacelle of the wind turbine so that the nacelle faces the estimated wind direction.

The relative wind direction is defined as the difference between the facing of the nacelle of the wind turbine and the wind direction. The relative wind direction may be determined with different degrees of precision e.g. the relative wind direction may specify the degrees of offset or it may simply specify whether the wind is coming from the left side or the right side of the nacelle of the wind turbine.

In some embodiments, the yaw data and the performance data is recorded for a measurement period, and wherein the yaw control system is configured to attempt to maximise energy production during the measurement period.

The yaw control system is preferably configured to attempt to maximize energy production without resulting in unnecessary wear of the wind turbine e.g. the yaw control system may attempt to limit the number of yaw operations in order not to wear some of the movable parts of the wind turbine.

In some embodiments, the wind turbine is operating within its design parameters during normal operation.

In some embodiments, the performance data is processed to determine the change in the performance data between before and after a yaw operation for each of the plurality of yaw operations.

Consequently, the effect on performance of the wind turbine for each of the plurality of the yaw operations may be estimated.

The change in the performance data between before and after a yaw operation may be normalized e.g. if the performance data is the generator output power the change in the power may be normalized by dividing the difference with the power after yawing as shown in equation 1:

$$\Delta P = \frac{\text{power}_{before\ yawing} - \text{power}_{after\ yawing}}{\text{power}_{after\ yawing}} \quad (1)$$

This will allow data to be used from a broader range of wind speeds.

In some embodiments, the change in the performance data is determined by comparing one or more values of the performance data before a yaw operation with one or more values of the performance data after the yaw operation, and wherein the one or more value of the performance data after the yaw operation are selected within a predetermined time period after the yaw operation.

Consequently, it may be secured that steady state has been reached after a yaw operation.

In some embodiments, the predetermined time period is between 0 seconds and 1 hour, between 0 seconds and 10 minutes, between 0 seconds and 5 minute, between 1 second and 1 minute, between 3 second and 45 seconds, or between 6 seconds and 30 seconds.

In some embodiments, a plurality of data points are created one for each yaw operation, wherein each data point specify the degrees of rotation, the direction of rotation, and the change in the performance data between before and after the yaw operation, and wherein the plurality of data points are processed to estimate the systematic yaw misalignment.

Consequently, an effective way of using the available data is provided.

In some embodiments, the plurality of data points are filtered using a first filtering function configured to remove data points believed to be unreliable before the remaining data points are processed to estimate the systematic yaw misalignment.

Consequently, the precision of the method may be increased.

In some embodiments, it is determined for each data point if the respective yaw operation was followed by a yaw free time period of a predetermined length and wherein the first filtering function removes the data points where the respective yaw operation is not follow by a yaw free time period of the predetermined length.

If a yaw operation is followed within a short period of time by another yaw operation the detection of the change in the performance data may not be correct. Thus, by filtering those data points out the overall precision of the method may be improved.

The yaw free period may be at least 5 seconds, 10 seconds, 30 seconds or 45 seconds.

In some embodiments, the first filtering function removes data points having a performance data value after the yaw operation below a predetermined lower limit.

When the performance data value is 'low' it means that the wind speed is low. Under very low wind speed the yaw control system may not function properly and the resulting data will therefore be noisy. Thus, by removing those data points the overall precision of the method may be improved.

In some embodiments, the first filtering function removes data points having a performance data value after the yaw operation above a predetermined upper limit.

When the performance data value is 'high' it means that the wind speed is high. When the performance data comprises data indicative of the generator output power and the wind turbine operate close to its rated power, the effect of a yaw operation may not be properly estimated.

In some embodiments, the method further comprises the step of:
receiving auxiliary data indicative of ambient weather conditions and/or the operational state of the wind turbine for each of the plurality of yaw operations;
wherein each of the plurality of data points are pre-processed using the auxiliary data.

Examples of ambient weather conditions are wind shear, wind veer, ambient turbulence and/or wind velocity. An example of the operational state of the wind turbine may be the specific wind direction sensor(s) used for each of the plurality of yaw operations, i.e. the primary wind direction sensor or a backup sensor.

In some embodiments, the auxiliary data is indicative of an estimated wind speed for each of the plurality of yaw operations.

The wind speed may be estimated by a wind speed sensor arranged on the wind turbine or it may be deducted from the generator output power.

In some embodiments, the pre-processing comprises adjusting the position of a data point based on the auxiliary data and/or determining whether to remove a data point based on the auxiliary data.

Consequently, the method may take account of known effects ambient weather conditions or the operational state of the wind turbine may have on the data points. As an example the systematic yaw misalignment may be wind speed dependent. Thus, if an estimate of the dependency between the systematic yaw misalignment and the wind speed is known, the data points may be adjusted to take account thereof. Alternatively, all data points may be removed where their respective yaw operation occurred at a time when the estimated wind speed was outside a pre-determined interval.

In some embodiments, the plurality of data points are binned into a plurality of bins wherein each bin contains the data points specifying degrees of rotation within a predetermined interval of degrees, and wherein each bin is filtered with a second filtering function.

Consequently, outliers may effectively be identified and removed and the precision of the method may be improved.

The second filtering function may be a median filter. The median filter may simply output the median of each bin, a number of the values being closest to the median of each bin, or the mean of a number of the values being closest to the median of each bin.

In some embodiments, the plurality of data points are processed to estimate the systematic yaw misalignment by fitting one or more curves to at least some of the plurality of data points and calculating a property of the one or more curves.

The property of the one or more curves may be the location of the peak (x-coordinate) of the one of more curves or a property related to the location of the peak.

In some embodiments, the property is the location of the peak of the curve or the slope of the curve.

According to a second aspect, the invention relates to a method for installing a wind turbine having a yaw control system, comprising the steps of:
assembling the different parts of the wind turbine;
starting operation of the wind turbine;
estimating the systematic yaw misalignment of the wind turbine using a method as explained in relation to the first aspect of the invention;
using the estimated systematic yaw misalignment to correct the yaw control system.

In some embodiments, the wind turbine has been in operation for a period of at least 3 months, 6 months, 1 year, 2 years, 5 year or 10 years before the systematic yaw misalignment is estimated.

According to a third aspect, the invention relates to a method of calibrating a yaw control system of a wind turbine comprising the steps of:
estimating the systematic yaw misalignment of the wind turbine using a method as disclosed in relation to the first aspect of the invention;
using the estimated systematic yaw misalignment to calibrate the yaw control system.

According to a fourth aspect, the invention relates to a method of identifying a faulty yaw control system of a wind turbine and correcting the faulty yaw control system, comprising the steps of:
estimating the systematic yaw misalignment of the wind turbine using a method as disclosed in relation to the first aspect of the invention;
correcting the yaw control system if the estimated systematic yaw misalignment is above a particular threshold.

According to a fifth aspect, the invention relates to a system comprising a wind turbine and a processing unit operatively connected to the wind turbine, wherein the processing unit is configured to estimate the systematic yaw misalignment of the wind turbine using a method as disclosed in relation to the first aspect of the invention.

According to a sixth aspect the invention relates to a computer program product comprising program code means adapted to cause a data processing system to perform the steps of the method disclosed in relation to the first aspect of the invention when said program code means are executed on the data processing system.

In some embodiments, said computer program product comprises a non-transitory computer-readable medium having stored thereon the program code means.

The different aspects of the present invention can be implemented in different ways including methods for estimating systematic yaw misalignment of a wind turbine, methods for installing a wind turbine, methods of calibrating a yaw control system of a wind turbine, methods of identifying a faulty yaw control system of a wind turbine and correcting the faulty yaw control system described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
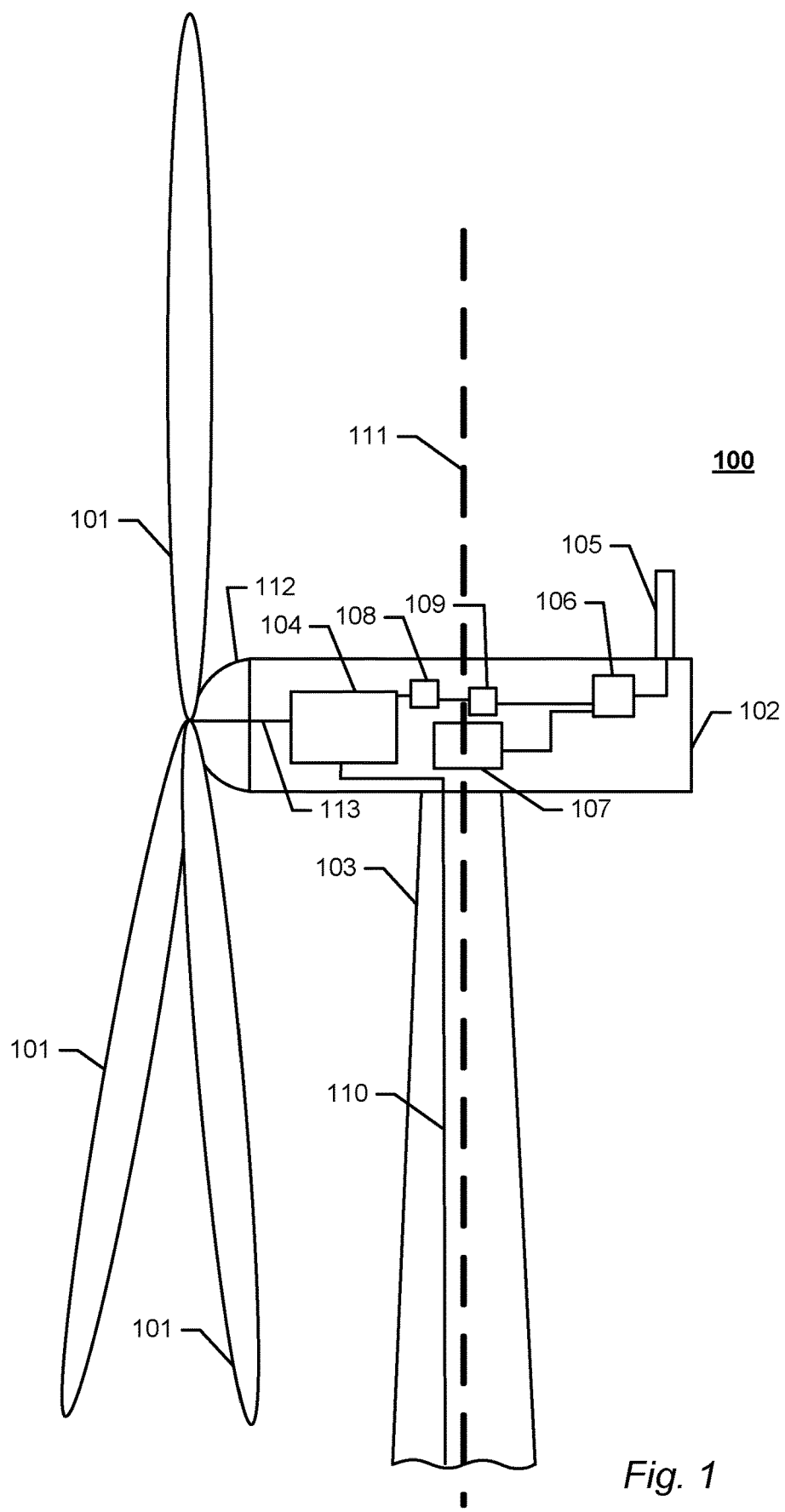
FIG. 1 shows a schematic drawing of a wind turbine according to an embodiment of the present invention.

FIG. 1 shows a schematic drawing of a wind turbine 100 according to an embodiment of the present invention. The wind turbine 100 is a horizontal-axis wind turbine. The wind turbine comprises a tower 103, a nacelle 102, and a rotor hub 112 connected to three rotor blades 101. The rotor blade/rotor hub assembly is connected to a shaft 113 that drives a generator 104. The generator generates 104 electric energy that is provided to the grid via electric connection 110. The generator 104 is connected to a control unit 108 that measures the generator output power. The control unit 108 is connected to a memory unit 109 and data representing the generator output power for any given time may be stored in the memory unit e.g. the control unit 108 may be configured to measure the generator output power with a particular sampling frequency and generate data packages containing the measured generator power and the time of the measurements and store the generated data packages in the memory unit 109. The wind turbine 100 further comprises a yaw control system 105 106 107. The yaw control system comprises a wind direction sensor 105 a yaw control unit 106 and an actuator 107 for rotating the nacelle 102 around a central axis 111 of the wind turbine 100. Once the yaw control unit 106 estimates that the relative wind direction is above/below a predetermined threshold, the yaw control unit 106 controls the actuator 107 to rotate the nacelle of the wind turbine so that the nacelle faces the estimated wind direction. The yaw control unit 106 is connected to the memory unit 109 that is configured to store yaw data. The yaw data may specify the degrees of rotation of the nacelle for the plurality of yaw operations. The yaw data may preferably specify the degrees of rotation for all yaw operations within a particular time period. The yaw data may preferably furthermore specify the direction of rotation for the plurality of yaw operations. The yaw data may furthermore specify the time for each yaw operation e.g. date, hour, minute, second for each of the plurality of yaw operations.

Figure 2A:
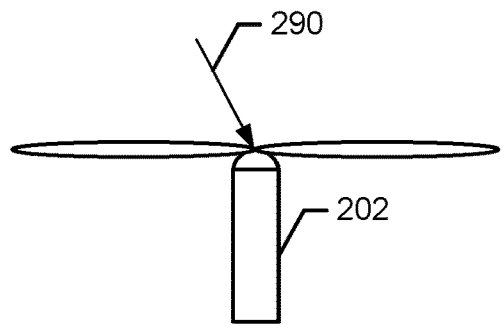
FIG. 2 illustrates the principle of a yaw control system.
Figure 2B:
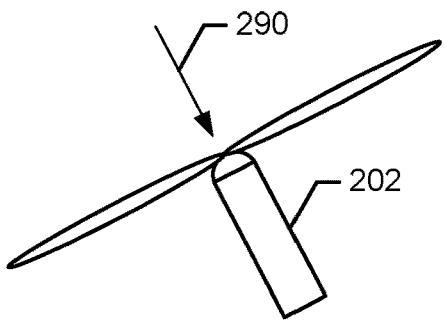

FIG. 2 illustrates the principle of a yaw control system. Shown is a top view of a nacelle 202 of a wind turbine. The arrow 290 illustrates the wind direction. FIG. 2a shows the nacelle 202 immediately before a yaw operation and FIG. 2b shows the nacelle 202 after a yaw operation.

Figure 3:
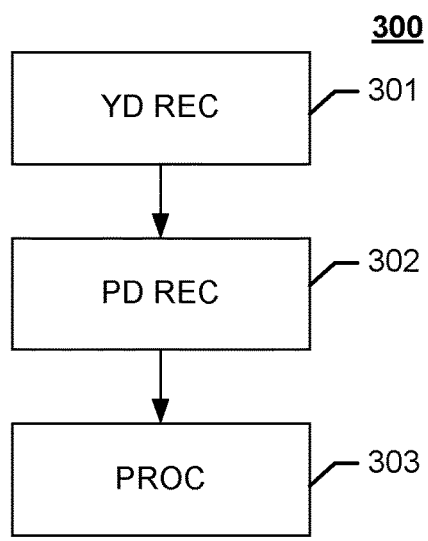
FIG. 3 shows a flow chart of a method according to an embodiment of the present invention.

FIG. 3 shows flow chart of a method 300 for estimating systematic yaw misalignment of a wind turbine having a nacelle and a yaw control system, according to an embodiment of the present invention. In the first step of the method 301 yaw data is received from the wind turbine indicative of the degrees of rotation of the nacelle for a plurality of yaw operations. Next, in step 302, performance data is received indicative of the alignment of the nacelle of the wind turbine with the wind direction before and after each of the plurality of yaw operations. Both the yaw data and the performance data is recorded during normal operation of the wind turbine, i.e. while the yaw control system is in operational mode and attempts to optimally align the nacelle of the wind turbine with the wind direction. Finally, in step 303, the yaw data and the performance data is processed together to estimate the systemic yaw misalignment of the wind turbine.

Figure 4:
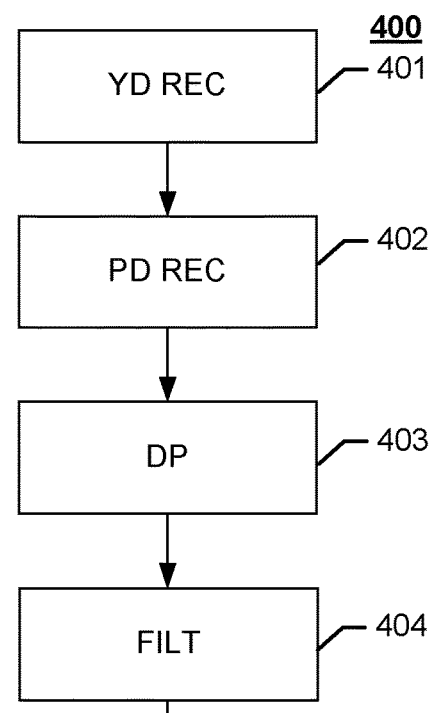
FIG. 4 shows a flow chart of a method according to an embodiment of the present invention.
Figure 5:
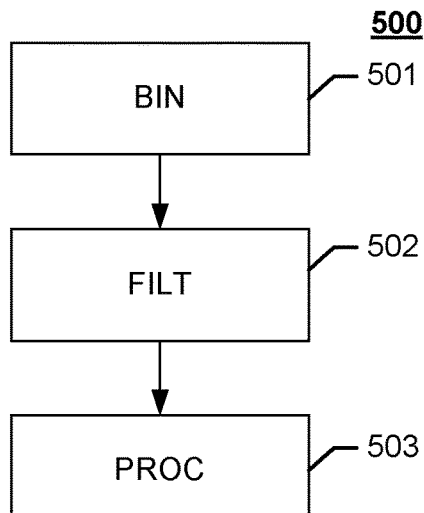
FIG. 5 shows a flow chart of a method according to an embodiment of the present invention.
Figure 8:
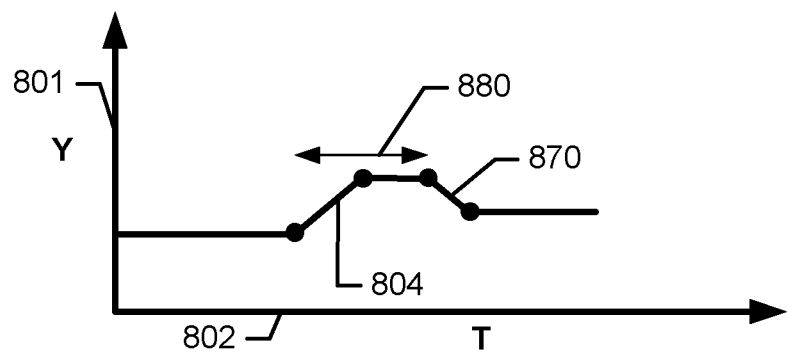
FIG. 8 is a graph illustrating a yaw operation.
Figure 9:
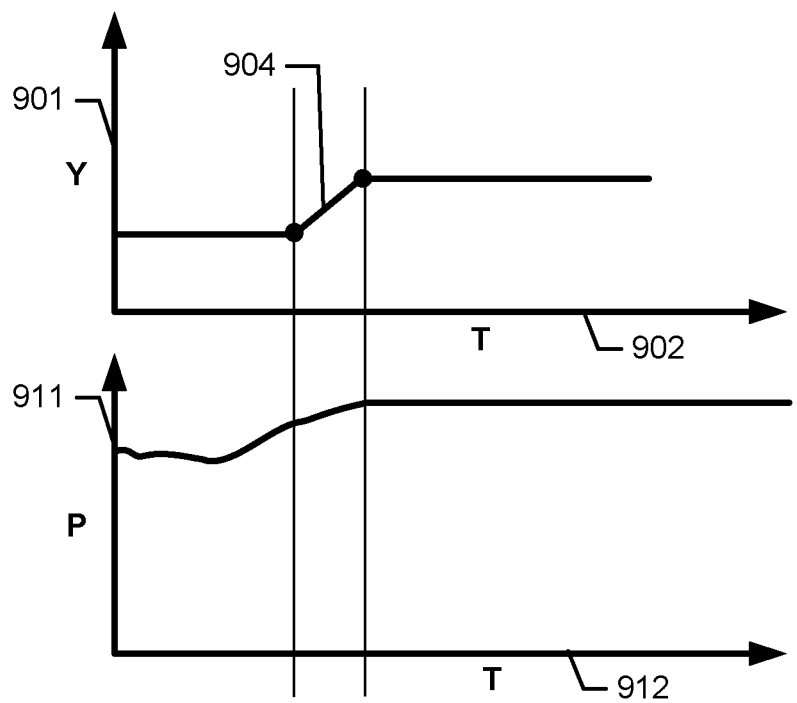
FIG. 9 is a graph illustrating a yaw operation and the effect on generator output power.

FIG. 4 shows flow chart of a method 400 for estimating systematic yaw misalignment of a wind turbine having a nacelle and a yaw control system according to an embodiment of the present invention. In the first step of the method 401 yaw data is received from the wind turbine indicative of the degrees of rotation of the nacelle for a plurality of yaw operations. Next, in step 402, performance data is received indicative of the alignment of the nacelle of the wind turbine with the wind direction before and after each of the plurality of yaw operations. Both the yaw data and the performance data is recorded during normal operation of the wind turbine, i.e. while the yaw control system is in operational mode and attempts to optimally align the nacelle of the wind turbine with the wind direction. Then in step 403, a plurality of data points are created one for each yaw operation (of the plurality of yaw operations), wherein each data point specify the degrees of rotation, the direction of rotation, and the change in the performance data between before and after the yaw operation. Next, in step 404 the plurality of data points are filtered using a first filtering function configured to remove data points believed to be unreliable. The first filtering function may remove the data points where the respective yaw operation was not followed by a yaw free time period of a predetermined length e.g. as illustrated in FIG. 8. The first filtering function may further remove data points having a performance data value after the yaw operation above a predetermined upper limit e.g. as illustrated in FIG. 9. Finally, in step 405 the plurality of data points are processed to estimate the systematic yaw misalignment. FIG. 5 shows a flowchart of a method 500 for processing the plurality of data points according to an embodiment of the invention. In the first step 501, the plurality of data points are binned into a plurality of bins wherein each bin contains the data points specifying a degrees of rotation within a predetermined interval of degrees. Next, in step 502, each bin is filtered with a second filtering function. The second filtering function is in this embodiment a median filter that outputs the median of each bin whereby the data points in each bin is reduced to a single data point. Finally in step 503, the plurality of data points are processed to estimate the systematic yaw misalignment by fitting one or more curves to the plurality of data points and calculating a property of the one or more curves. The property of the one or more curves may be the location of the peak (x-coordinate) of the one or more curves or a property related to the location of the peak.

Figure 10A:
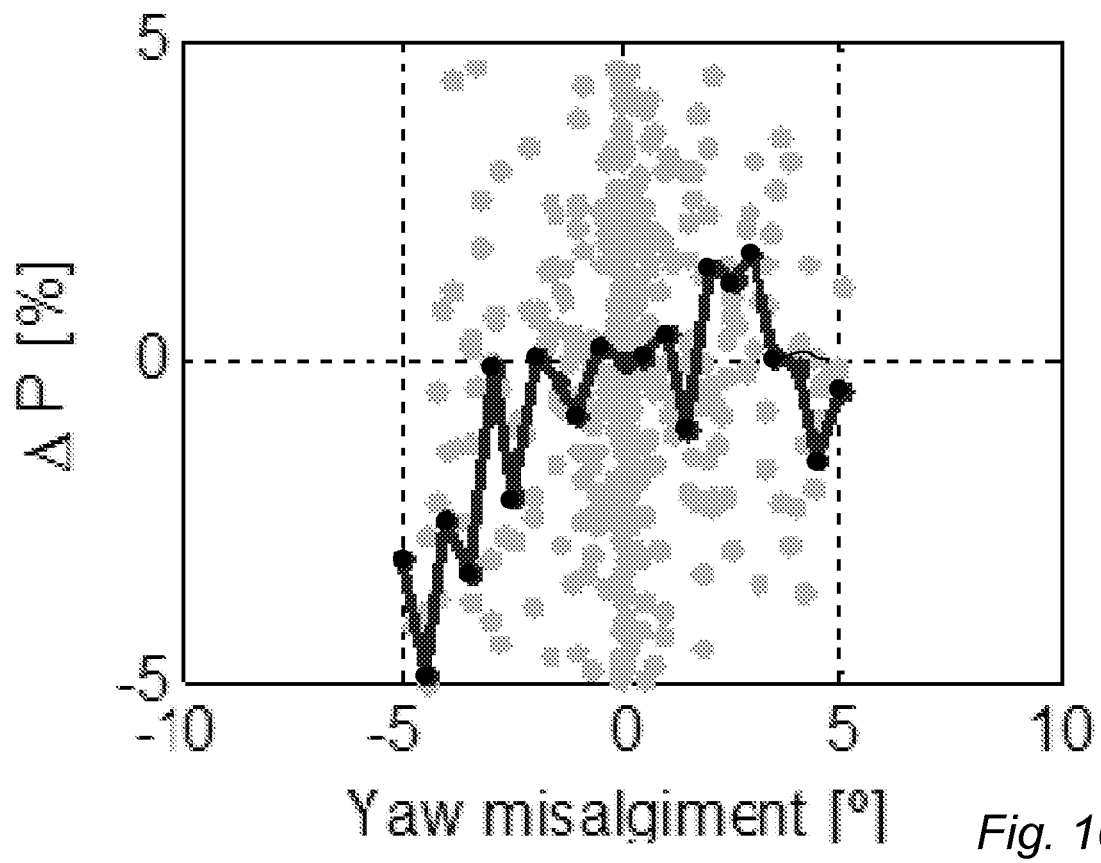
FIG. 10 illustrates how a plurality of data points may be processed in accordance with embodiments of the present invention.
Figure 10B:
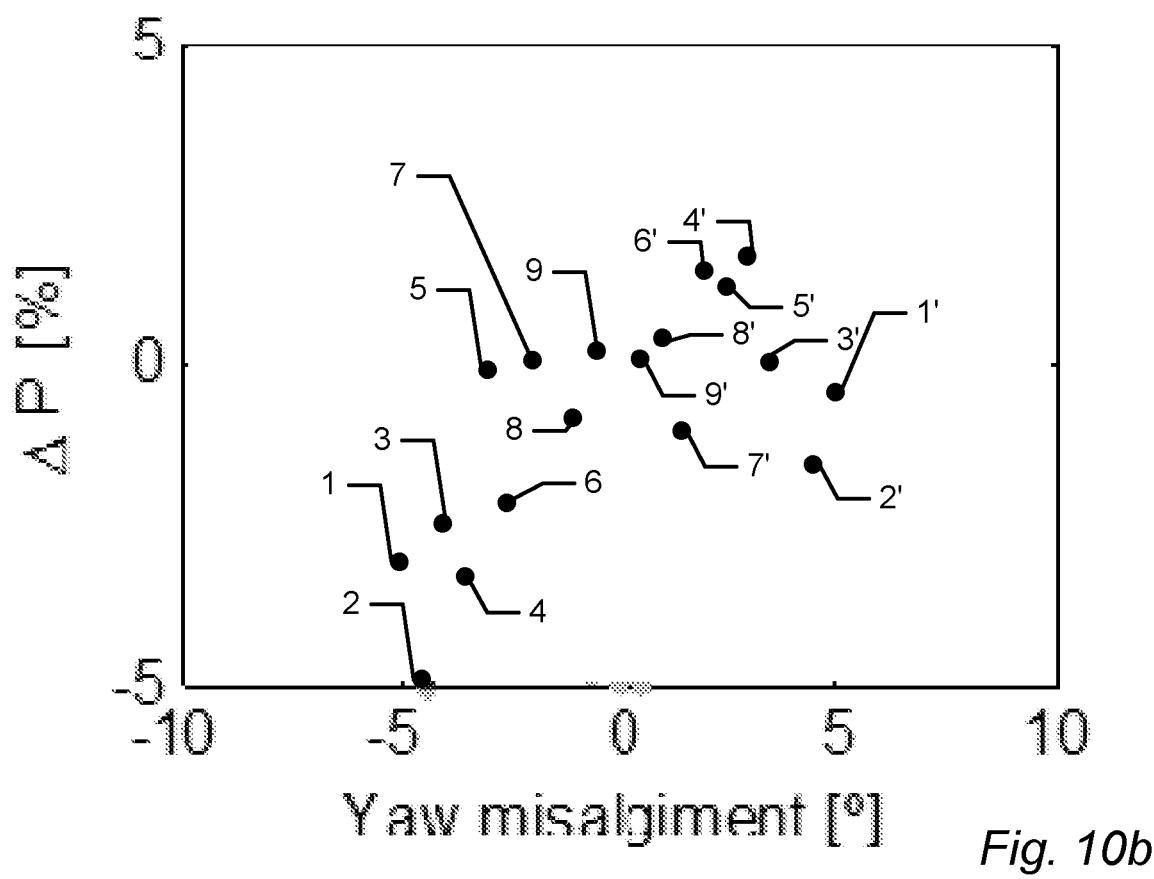

In some embodiments, it is assumed that the curve can be expanded into a Taylor series and that, after discarding terms involving derivatives of order higher than two, the curve given by the medians in the bins, is described by some second order curve:

$$\Delta P_i = a\Delta yaw_i^2 + b\Delta yaw_i + c \quad (2)$$

where $\Delta P_i$ is the change in performance data between before and after the yaw operation for the i'th bin, and $\Delta yaw_i$ is the degrees of rotation for the i'th bin. FIG. 10 show a plot of a plurality of binned data points for a particular data set. FIG. 10*a* shows all data points in the bins as light gray dots before filtration with the second filtering function. It should be noted that a number of the data points are arranged on top of each other (this cannot be seen in the figure). The dark dots are the median of each bin (the output of the second filtering function). The dark dots are connected to form a curve. It is this curve that is assumed to be given by some second order curve. FIG. 10*b* shows only the medians.

It can be shown that b in equation (2) is given by $$b = \frac{\Delta P_i - \Delta P_{-i}}{2\Delta yaw_i} \quad (3)$$

Thus for each pair of binned values situated equally far, $d_i = |\Delta yaw_i|$, from the origin we get an independent estimate of the slope at the origin, b through $$slope_i = \frac{\Delta P_i - \Delta P_{-i}}{2d_i} \quad (4)$$

Thus, for the data set shown in FIG. 10, the medians 1 and 1' are used to estimate the slope at the origin, the medians 2 and 2' are used to estimate the slop of the origin, the medians 3 and 3' are used to estimate the slope of the origin, and so forth. This results in nine independent estimates of the slop of the origin. Thus, nine curves (first order polynomials) are fitted to the plurality of data points and the slope of each curve is found.

If the variance of each bin median, $\Delta P_i$, is assumed to vary with the number of observations in the bin, $n_i$, according to $1/n_i$ then the variance in each calculated slope is given by $$\sigma_i^2 \sim \frac{1/n_i + 1/n_{-i}}{4d_i^2} \quad (5)$$

The maximum likelihood estimate of the slope at the origin is then given by the weighted mean:

$$\overline{slope} = \frac{\sum_i slope_i \sigma_i^{-2}}{\sum_j \sigma_j^{-2}} = \sum_i w_i slope_i \quad (6)$$

where we have introduced $$w_i = \sigma_i^{-2} / \sum \sigma_j^{-2} = \frac{4d_i^2}{1/n_i + 1/n_{-i}} / \sum \frac{4d_j^2}{1/n_j + 1/n_{-j}} \quad (7)$$

The variance of $\overline{slope}$ can now be estimated by $$\sigma_{\overline{slope}}^2 = \frac{\sum_i (slope_i - \overline{slope})^2 \sigma_i^{-2}}{(N-1)\sum_j \sigma_j^{-2}} = \frac{\sum_i w_i (slope_i - \overline{slope})^2}{(N-1)} \quad (8)$$

It is assumed that the performance loss as a function of yaw misalignment is given by $1 - \cos^3(yaw)$, at least for small yaw angles. To be consistent with our second order assumptions when calculating the slope we will more precisely assume that performance vs yaw misalignment is given by $$\text{Performance loss} = 1 - C\frac{\Delta yaw^2}{2}$$

where $$C = 3\frac{\pi^2}{180^2} \approx \frac{1}{1094}$$

is the second derivative of $\cos^3(\Delta yaw)$ at the origin. The systematic yaw misalignment angle is then derived from the measured slope through $-1094\,\overline{slope}$, i.e. by simply multiplying the estimated slope with the constant $-1094$. With the opposite sign convention for the systematic yaw misalignment the estimate would simply have the opposite sign.

The performance loss as a function of yaw misalignment may of course be assumed to follow a different function whereby slightly different results may be derived.

Figure 10C:
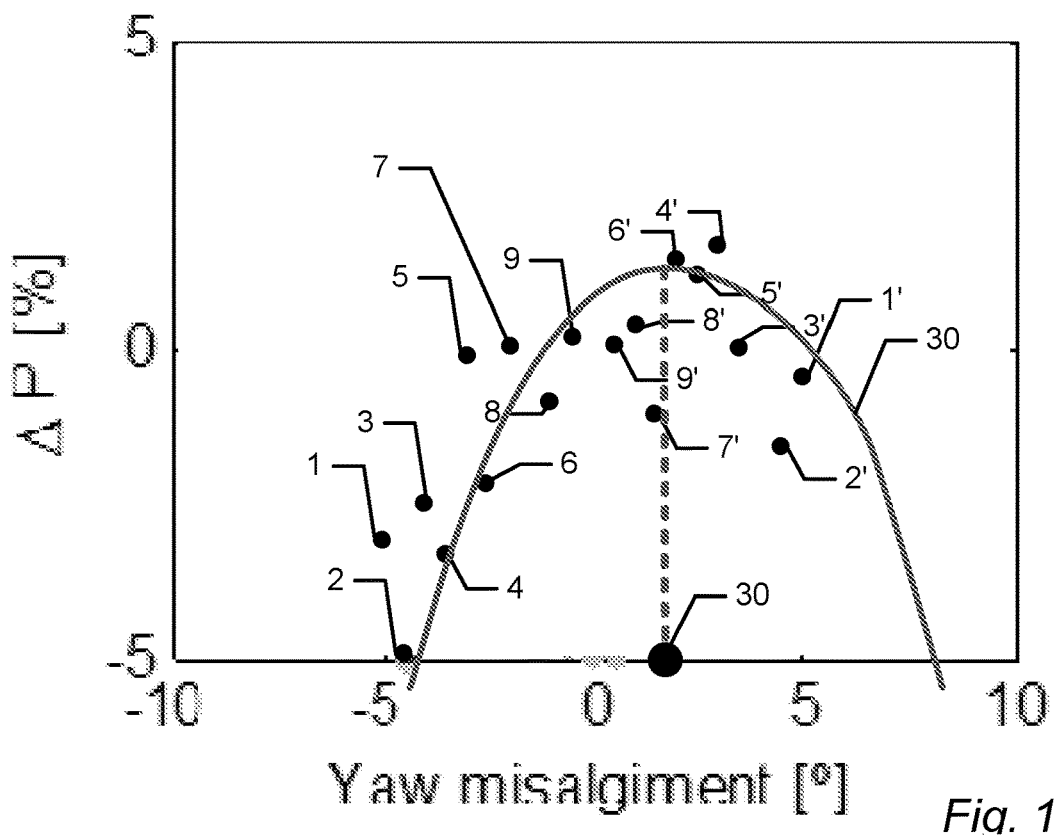

FIG. 10*c* shows an alternative method of processing the plurality of data points to estimate the systematic yaw misalignment, according to an embodiment of the present invention. In this embodiment, a single function 30 is fitted to all the medians of the bins, and the estimate of the systematic yaw misalignment is found by finding the location of the peak in this example approximately +1.5 degrees.

Figure 6:
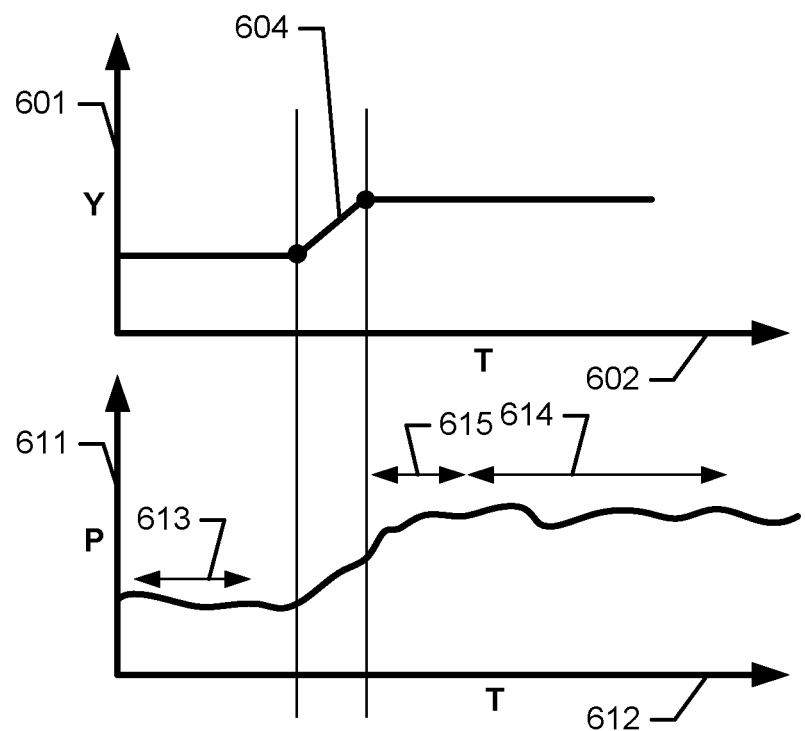
FIG. 6 is a graph illustrating a yaw operation and the effect on generator output power.

FIG. 6 shows two graphs illustrating a yaw operation 604 and the effect on generator output power. The top graph shows the yaw angle as a function of time, where the axis 601 represents yaw angle and the axis 602 represents time. The bottom graph shows the resulting generator output power as a function of time, where the axis 611 represents generator output power and the axis 612 represents time. Immediately before the yaw operation 604 the nacelle of the wind turbine will be unaligned with the wind direction and the generator output power 613 will be 'low'. After the yaw operation 604 the nacelle of the wind turbine will be (almost) aligned with the wind direction and the generator output power 614 will therefore increase. The nacelle of the wind turbine will however still be slightly unaligned with the wind direction after the yaw operation as a result of the systematic yaw misalignment. It can be seen in the lower graph that it takes a period of time 615 after the yaw operation before the full effect of the yaw operation can be observed. Thus by comparing one or more values of the performance data before a yaw operation with one or more values of the performance data after the yaw operation selected within a predetermined time period 615 after the yaw operation a more precise estimate of the change in the performance data may be found.

Figure 7:
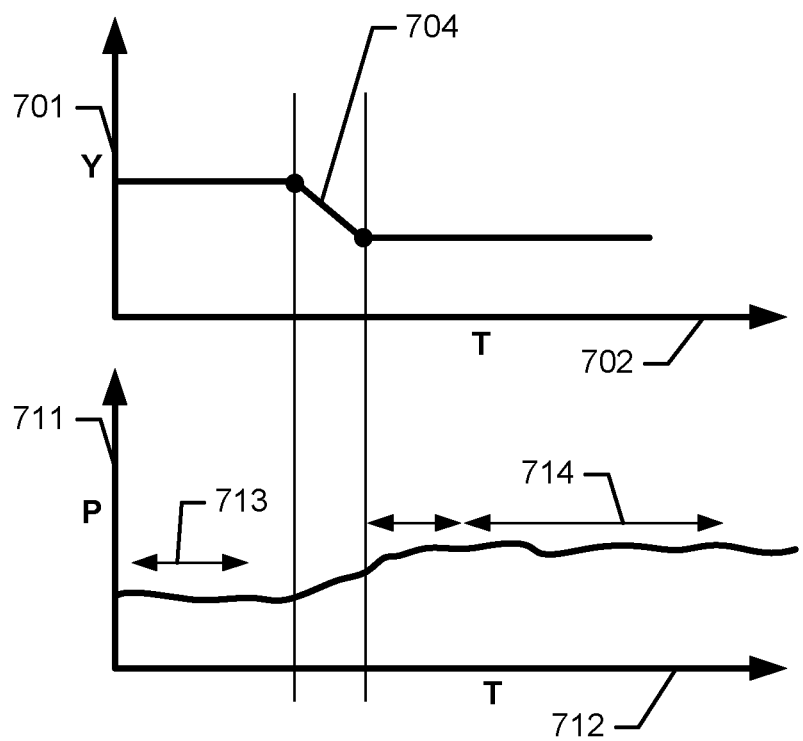
FIG. 7 is a graph illustrating a yaw operation and the effect on generator output power.

FIG. 7 shows two graphs illustrating a yaw operation 704 and the effect on generator output power. The top graph shows the yaw angle as a function of time, where the axis

701 represents yaw angle and the axis 702 represents time. The bottom graph shows the resulting generator output power as a function of time, where the axis 711 represents generator output power and the axis 712 represents time. Immediately before the yaw operation 704 the nacelle of the wind turbine will be unaligned with the wind direction and the generator output power 613 will be 'low'. After the yaw operation 704 the nacelle of the wind turbine will be (almost) aligned with the wind direction and the generator output power 714 will therefore increase. In this example the yaw operation 704 is of the same size as the yaw operation 604 in FIG. 6 however in the opposite direction. If no systematic yaw misalignment was present the effect of the yaw operation on the generator output power would be the same in FIG. 6 and FIG. 7, however as can be seen the effect in FIG. 7 is slightly less as a result of a systematic yaw misalignment.

FIG. 8 shows a graph illustrating a yaw operation. The axis 801 represents yaw angle and the axis 802 represents time. In this example, a first yaw operation 804 is followed within a short period of time 880 by a second yaw operation. In some embodiments, the data points resulting from the two yaw operations 804 870 will be removed by a first filtering function.

FIG. 9 shows two graphs illustrating a yaw operation 904 and the effect on generator output power. The top graph shows the yaw angle as a function of time, where the axis 901 represents yaw angle and the axis 902 represents time. The bottom graph shows the resulting generator output power, where the axis 911 represents generator output power and the axis 912 represents time. Immediately before the yaw operation 904 the nacelle of the wind turbine will be unaligned with the wind direction and the generator output power will be 'low'. After the yaw operation 904 the nacelle of the wind turbine will be (almost) aligned with the wind direction and the generator output power will therefore increase. However, in this example the wind turbine will be operating at its rated power after the yaw operation 904, whereby the change in the output power no longer is a reliable measure of the alignment of the nacelle of the wind turbine with the wind direction and the resulting data point may therefore be filtered out.

Figure 11:
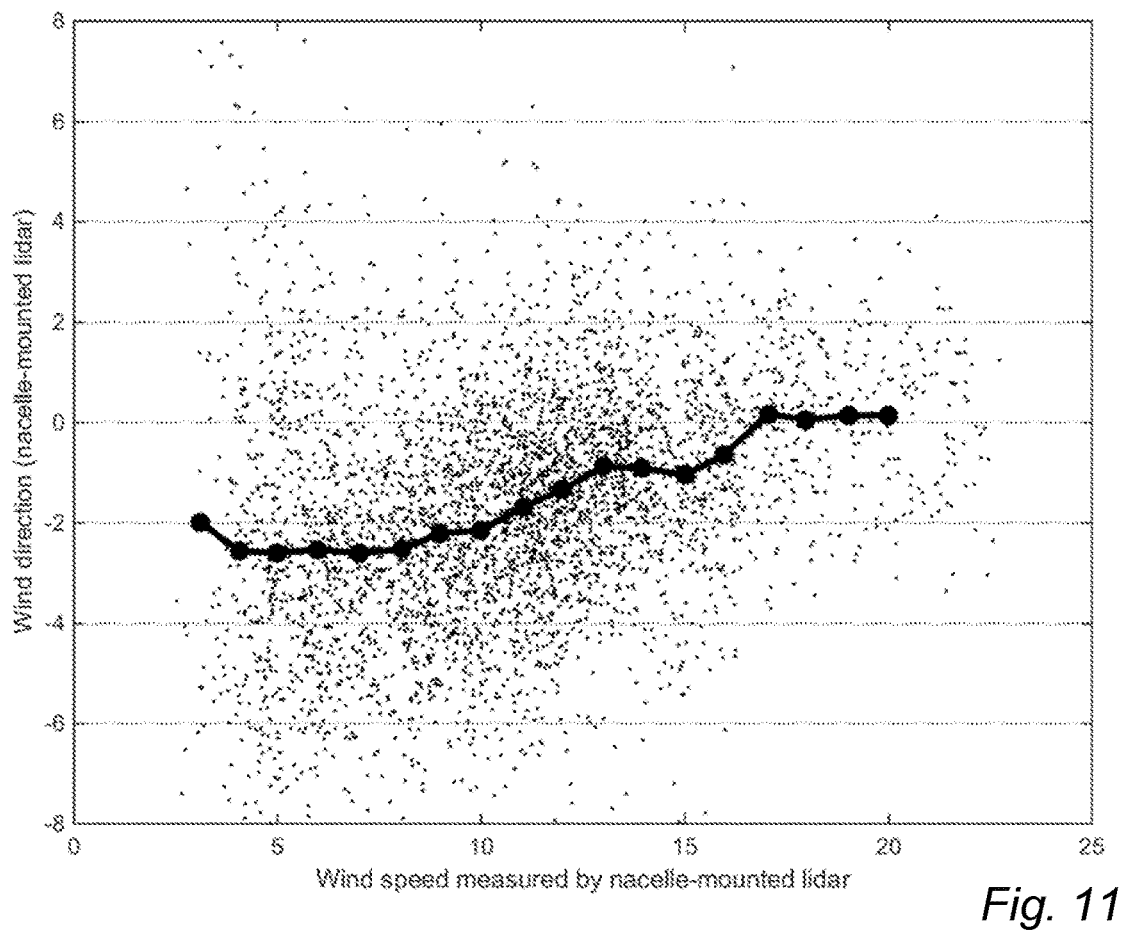
FIG. 11 illustrates that the systematic yaw misalignment may depend on the operational state of the wind turbine and/or ambient weather conditions.

The systematic yaw misalignment angle may depend on the operational state of the wind turbine, for example such that the yaw misalignment angle depends on the fraction of the power available in the wind, which is extracted by the wind turbine. Furthermore, some wind turbine controllers applies a correction to the wind turbine's internal wind direction measurement based on the wind turbine's internal wind speed measurement, and this correction may influence the systematic yaw misalignment. In addition, the systematic yaw misalignment angle may depend on external conditions such as the wind shear, wind veer, ambient turbulence and/or wind velocity. FIG. 11 shows the relative wind direction versus wind speed as measured by a forward looking nacelle mounted lidar. The mean relative wind direction which is closely related to the systematic yaw misalignment is in this example shown to vary with the turbine operational state and/or ambient conditions. For reasons such as these, it may, in some embodiments, be beneficial to adjust and/or filter the data points based on the operational state of the wind turbine or ambient conditions prior to binning.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for estimating systematic yaw misalignment of a wind turbine having a nacelle and a yaw control system, comprising:
   receiving yaw data from the wind turbine indicative of the degrees of rotation of the nacelle for a plurality of yaw operations; and
   receiving performance data from the wind turbine indicative of the alignment of the nacelle of the wind turbine with the wind direction,
   wherein the yaw data and the performance data are recorded during normal operation of the wind turbine,
   wherein for each yaw operation of the plurality of yaw operations, the yaw control system is configured to firstly estimate the wind direction and secondly rotate the nacelle of the wind turbine so that the nacelle faces the estimated wind direction,
   wherein the performance data is indicative of the alignment of the nacelle of the wind turbine with the wind direction before and after each of the plurality of yaw operations,
   wherein the performance data is processed to determine a normalized change in the performance data between before and after a yaw operation for each of the plurality of yaw operations, and
   wherein the yaw data and the performance data are processed together to estimate the systemic yaw misalignment of the wind turbine; and
   wherein the yaw data and the performance data are recorded for a measurement period greater than or equal to 12 hours.

2. The method according to claim 1, wherein the performance data comprises data indicative of one or more of the following:
   generator output power;
   rotational speed of the blades of the wind turbine; or
   pitch angle of the blades of the wind turbine.

3. The method according to claim 1, wherein the yaw data and the performance data are recorded for a measurement period greater than or equal to 24 hours, 48 hours, 1 week, 2 weeks, 1 month, 3 months, 6 months, or 12 months.

4. The method according to claim 1, wherein the change in the performance data is determined by comparing one or more values of the performance data before a yaw operation with one or more values of the performance data after the yaw operation, and wherein the one or more values of the performance data after the yaw operation are selected within a predetermined time period after the yaw operation.

5. The method according to claim 1, wherein the predetermined time period is between 0 seconds and 1 hour, between 0 seconds and 10 minutes, between 0 seconds and 5 minutes, between 1 second and 1 minute, between 3 seconds and 45 seconds, or between 6 seconds and 30 seconds after the yaw operation.

6. The method according to claim 1, wherein a plurality of data points are created one for each yaw operation, wherein each data point specifies the degrees of rotation, the direction of rotation, and the change in the performance data between before and after the yaw operation, and wherein the plurality of data points are processed to estimate the systematic yaw misalignment.

7. The method according to claim 6, wherein the plurality of data points are filtered using a first filtering function configured to remove data points believed to be unreliable before the remaining data points are processed to estimate the systematic yaw misalignment.

8. The method according to claim 7, wherein it is determined for each data point if the respective yaw operation was followed by a yaw free time period of a predetermined length and wherein the first filtering function removes the data points where the respective yaw operation was not followed by a yaw free time period of the predetermined length.

9. The method according to claim 7, wherein the first filtering function removes data points having a performance data value after the yaw operation above a predetermined upper limit.

10. The method according to claim 6, wherein the method further comprises:
receiving auxiliary data indicative of ambient weather conditions and/or the operational state of the wind turbine for each of the plurality of yaw operations; and
wherein each of the plurality of data points are pre-processed using the auxiliary data.

11. The method according to claim 6, wherein the plurality of data points are binned into a plurality of bins wherein each bin comprises the data points specifying degrees of rotation within a predetermined interval of degrees, and wherein each bin is filtered with a second filtering function.

12. The method according to claim 6, wherein the plurality of data points are processed to estimate the systematic yaw misalignment by fitting one or more curves to the plurality of data points and calculating a property of the one or more curves.

13. The method according to claim 1, wherein the yaw data and the performance data is recorded for a measurement period, and wherein the yaw control system is configured to attempt to maximize energy production during the measurement period.

14. A system comprising a wind turbine and a processing unit operatively connected to the wind turbine, wherein the processing unit is configured to estimate the systematic yaw misalignment of the wind turbine using the method according to claim 1.

15. A computer program product comprising program code means adapted to cause a data processing system to perform the method according to claim 1 when said program code means are executed on the data processing system.

16. A method for installing a wind turbine having a yaw control system, comprising:
assembling the different parts of the wind turbine;
starting operation of the wind turbine;
receiving yaw data from the wind turbine indicative of the degrees of rotation of a nacelle of the wind turbine for a plurality of yaw operations; and
receiving performance data from the wind turbine indicative of the alignment of the nacelle of the wind turbine with the wind direction;
wherein the yaw data and the performance data are recorded during normal operation of the wind turbine,
wherein for each yaw operation of the plurality of yaw operations, the yaw control system is configured to firstly estimate the wind direction and secondly rotate the nacelle of the wind turbine so that the nacelle faces the estimated wind direction,
wherein the performance data is indicative of the alignment of the nacelle of the wind turbine with the wind direction before and after each of the plurality of yaw operations,
wherein the performance data is processed to determine a normalized change in the performance data between before and after a yaw operation for each of the plurality of yaw operations,
wherein the yaw data and the performance data are processed together to estimate the systemic yaw misalignment of the wind turbine; and
wherein the yaw data and the performance data are recorded for a measurement period greater than or equal to 12 hours; and
using the estimated systematic yaw misalignment to correct the yaw control system.

17. A method of calibrating a yaw control system of a wind turbine comprising:
receiving yaw data from the wind turbine indicative of the degrees of rotation of a nacelle of the wind turbine for a plurality of yaw operations; and
receiving performance data from the wind turbine indicative of the alignment of the nacelle of the wind turbine with the wind direction;
wherein the yaw data and the performance data are recorded during normal operation of the wind turbine,
wherein for each yaw operation of the plurality of yaw operations, the yaw control system is configured to firstly estimate the wind direction and secondly rotate the nacelle of the wind turbine so that the nacelle faces the estimated wind direction,
wherein the performance data is indicative of the alignment of the nacelle of the wind turbine with the wind direction before and after each of the plurality of yaw operations,
wherein the performance data is processed to determine a normalized change in the performance data between before and after a yaw operation for each of the plurality of yaw operations,
wherein the yaw data and the performance data are processed together to estimate the systemic yaw misalignment of the wind turbine; and
wherein the yaw data and the performance data are recorded for a measurement period greater than or equal to 12 hours; and
using the estimated systematic yaw misalignment to calibrate the yaw control system.

18. A method of identifying a faulty yaw control system of a wind turbine and correcting the faulty yaw control system, comprising:
receiving yaw data from the wind turbine indicative of the degrees of rotation of a nacelle of the wind turbine for a plurality of yaw operations; and
receiving performance data from the wind turbine indicative of the alignment of the nacelle of the wind turbine with the wind direction;
wherein the yaw data and the performance data are recorded during normal operation of the wind turbine,
wherein for each yaw operation of the plurality of yaw operations, the yaw control system is configured to firstly estimate the wind direction and secondly rotate the nacelle of the wind turbine so that the nacelle faces the estimated wind direction, wherein the performance data is indicative of the alignment of the nacelle of the wind turbine with the wind direction before and after each of the plurality of yaw operations, wherein the performance data is processed to determine a normalized change in the performance data between before and after a yaw operation for each of the plurality of yaw operations, wherein the yaw data and the performance data are processed together to estimate the systemic yaw misalignment of the wind turbine; and wherein the yaw data and the performance data are recorded for a measurement period greater than or equal to 12 hours; and correcting the yaw control system if the estimated systematic yaw misalignment is above a particular threshold.

* * * * *